US012619239B2

(12) United States Patent
Wang

(10) Patent No.: US 12,619,239 B2
(45) Date of Patent: May 5, 2026

(54) REMOTE CONTROL METHOD AND DEVICE

(71) Applicant: Lenovo (Beijing) Limited, Beijing (CN)

(72) Inventor: Heping Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 234 days.

(21) Appl. No.: 18/185,588

(22) Filed: Mar. 17, 2023

(65) Prior Publication Data

US 2023/0418300 A1     Dec. 28, 2023

(30) Foreign Application Priority Data

Jun. 28, 2022    (CN) .......................... 202210754270.6

(51) Int. Cl.
*G05D 1/00*        (2024.01)
*G05D 1/221*      (2024.01)
*G06V 10/75*     (2022.01)

(52) U.S. Cl.
CPC ......... *G05D 1/0219* (2013.01); *G05D 1/0016* (2013.01); *G06V 10/75* (2022.01)

(58) Field of Classification Search
CPC ........... B60W 10/00; B60W 60/00276; B60W 2300/00; B60W 2530/213; B60W 2540/041; B60W 2540/049; B60W 2552/00; B60W 2556/65; B60W 2710/00; B60W 2720/406; B60W 2754/00; B60W 2900/00; G05D 1/20; G05D 1/249; G05D 1/498; G05D 1/60; G05D 1/6987; G05D 1/80; G05D 1/87; G05D 2101/00; G05D 2101/26; G05D 2103/00; G05D 2105/00; G05D 2105/93; G05D 2107/00; G05D 2107/95; G05D 2109/00; G05D 2109/50; G05D 2111/00; G05D 2111/67; G05D 1/0219; G05D 1/0016; G05D 1/221; G06V 10/75

See application file for complete search history.

(56) References Cited

U.S. PATENT DOCUMENTS

| | | | |
|---|---|---|---|
| 2021/0205992 A1* | 7/2021 | Pandya ................... | B25J 9/1664 |
| 2022/0105636 A1* | 4/2022 | Oboril .................... | B25J 9/1676 |
| 2022/0125270 A1* | 4/2022 | Cao ........................... | A47L 9/281 |
| 2023/0027984 A1* | 1/2023 | Rodrigues .............. | B65G 61/00 |
| 2023/0099602 A1* | 3/2023 | Hashiguchi .......... | G05B 19/418 700/245 |

* cited by examiner

*Primary Examiner* — Adam R Mott
*Assistant Examiner* — Heather J Keniry
(74) *Attorney, Agent, or Firm* — ANOVA LAW GROUP, PLLC

(57) ABSTRACT

A remote-control method being applied to a controlled terminal includes: obtaining first environment information; sending the first environment information to a control terminal; receiving a first control instruction sent by the control terminal, the first control instruction and the first environment information having a mapping relationship; obtaining second environment information; and determining an execution state of the first control instruction based on difference information between the first environment information and the second environment information.

15 Claims, 6 Drawing Sheets

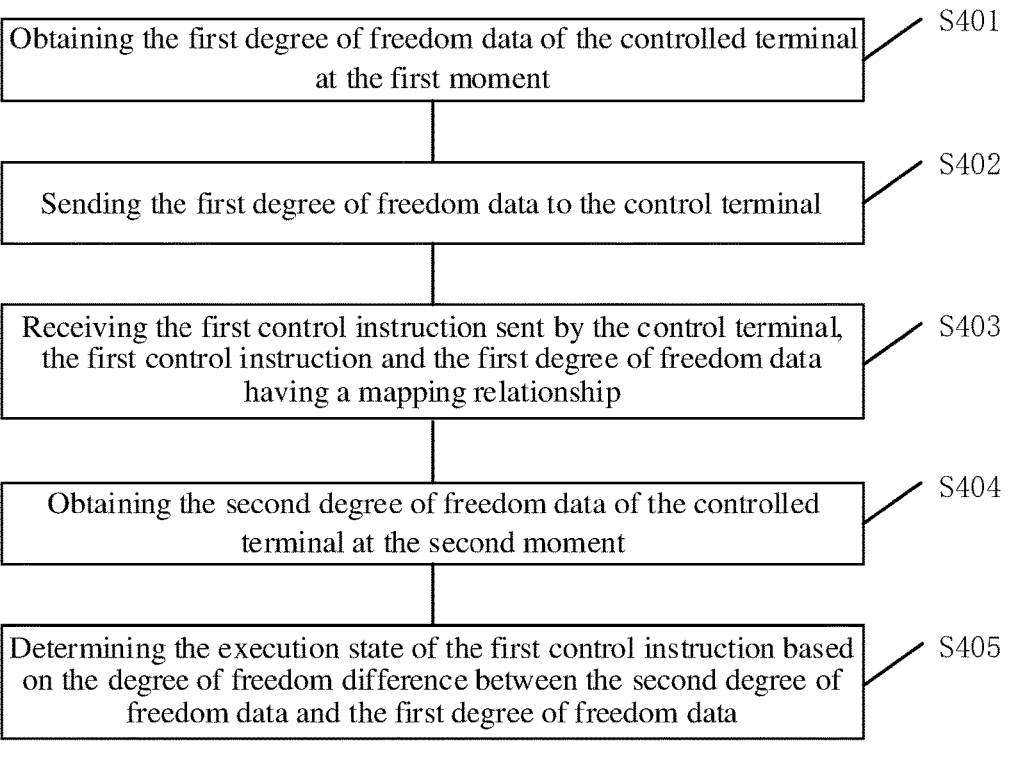

Obtaining the first degree of freedom data of the controlled terminal at the first moment — S401

Sending the first degree of freedom data to the control terminal — S402

Receiving the first control instruction sent by the control terminal, the first control instruction and the first degree of freedom data having a mapping relationship — S403

Obtaining the second degree of freedom data of the controlled terminal at the second moment — S404

Determining the execution state of the first control instruction based on the degree of freedom difference between the second degree of freedom data and the first degree of freedom data — S405

FIG. 4

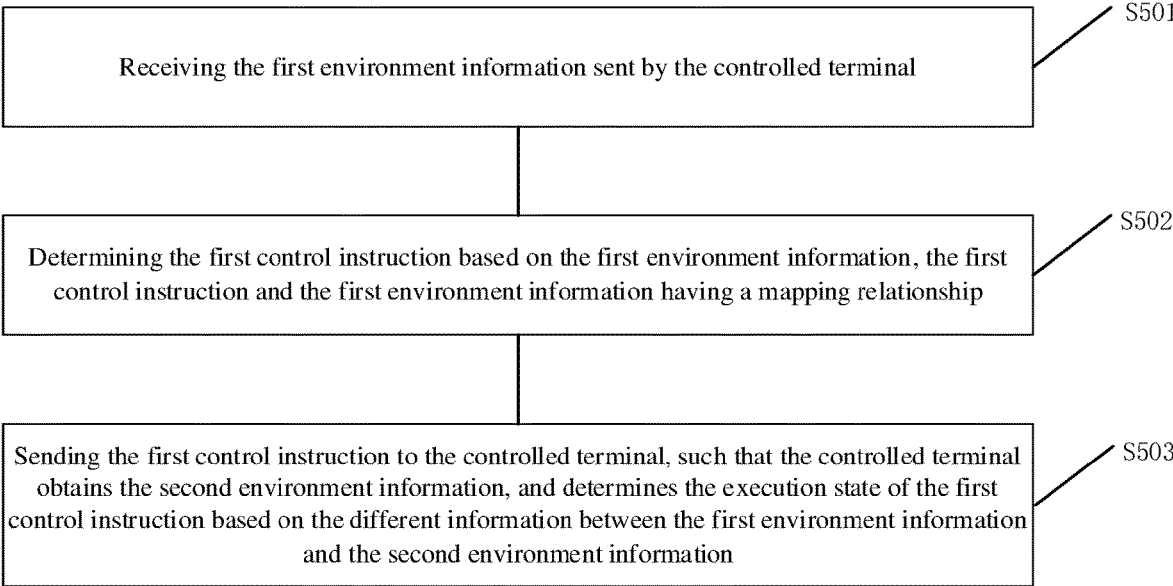

Receiving the first environment information sent by the controlled terminal — S501

Determining the first control instruction based on the first environment information, the first control instruction and the first environment information having a mapping relationship — S502

Sending the first control instruction to the controlled terminal, such that the controlled terminal obtains the second environment information, and determines the execution state of the first control instruction based on the different information between the first environment information and the second environment information — S503

FIG. 5

REMOTE CONTROL METHOD AND DEVICE

CROSS-REFERENCE TO RELATED APPLICATION

This application claims priority to Chinese Patent Application No. 202210754270.6, filed on Jun. 28, 2022, the entire content of which is incorporated herein by reference.

TECHNICAL FIELD

The present disclosure relates to the technical field of smart control and, more particularly, to a remote-control method and a remote-control device.

BACKGROUND

Remote-control technology has been widely used in various fields, such as telemedicine, remote maintenance and remote expert systems. The principle of remote-control technology is to send back images and audios remotely, and then perform further processing based on the images and audios. In the process of performing remote control, some images change relatively little. For example, in the process of remote maintenance, there is a situation where a device needs to be observed for a long time. During the process of observing the device, the images only change slightly. There are also some scenarios where the images change relatively quickly. For example, when a robot is remotely controlled, and the robot is in constant movement. In order to reduce errors in the remote-control process, some industries or enterprises improve the accuracy of remote control through controlling parameters such as the throughput rate and the network delay of the communication network used for remote control. For example, 5G wireless technology is adopted to improve the throughput rate of the communication network and reduce the network delay. However, there are still many scenarios of image delays in the actual remote-control process, thereby causing errors or deviations in the remote-control process.

SUMMARY

One aspect of the present disclosure provides a remote-control method being applied to a controlled terminal. The remote-control method includes: obtaining first environment information; sending the first environment information to a control terminal; receiving a first control instruction sent by the control terminal, the first control instruction and the first environment information having a mapping relationship; obtaining second environment information; and determining an execution state of the first control instruction based on difference information between the first environment information and the second environment information.

Another aspect of the present disclosure provides a remote-control method being applied to a control terminal. The remote-control method includes: receiving first environment information sent by a controlled terminal; determining a first control instruction for controlling the controlled terminal based on the first environment information, the first control instruction and the first environment information having a mapping relationship; and sending the first control instruction to the controlled terminal, such that the controlled terminal obtains second environment information, and determines an execution state of the first control instruction based on difference information between the first environment information and the second environment information.

Another aspect of the present disclosure provides a remote-control device being applied to a controlled terminal. The remote-control device includes: a memory storing program instructions and a processor coupled to the memory. When being executed by the processor, the program instructions cause the processor to: obtain first environment information; send the first environment information to a control terminal; receive a first control instruction sent by the control terminal, the first control instruction and the first environment information having a mapping relationship; obtain second environment information; and determine an execution state of the first control instruction based on difference information between the first environment information and the second environment information.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

In the drawings, the same or corresponding reference numerals denote the same or corresponding parts.

FIG. 4 is a flowchart of another exemplary remote-control method according to some embodiments of the present disclosure;

FIG. 5 is a flowchart of another exemplary remote-control method according to some embodiments of the present disclosure;

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

The technical solutions of the present disclosure are described in detail below with the accompanying drawings.

Figure 1:
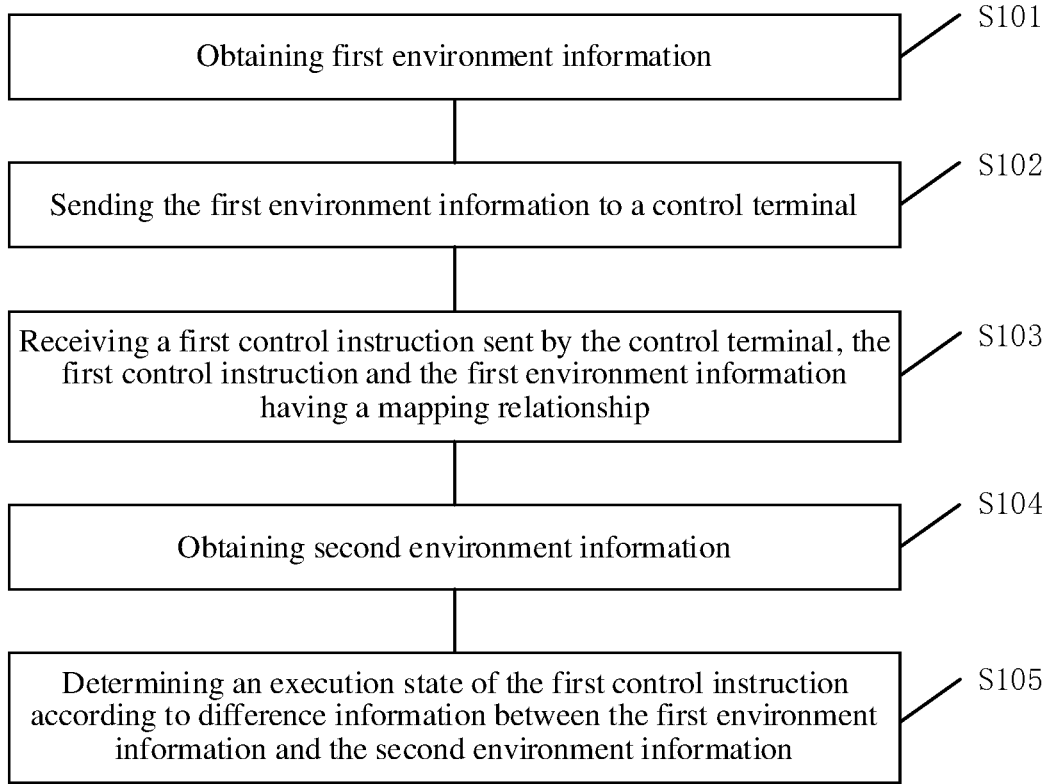
FIG. 1 is a flowchart of an exemplary remote-control method according to some embodiments of the present disclosure.

FIG. 1 is a flowchart of an exemplary remote-control method according to some embodiments of the present disclosure. The remote-control method may be applied to a controlled terminal. As shown in FIG. 1, the remote-control method at least includes the following processes.

At S101, first environment information is obtained.

In some embodiments, the first environment information is mainly used to show a working environment or a state of a controlled terminal at a first moment.

In some embodiments, the first environment information may be image information collected by an image collection device of the controlled terminal, such as a visual image of a robot. The first environment information may also be an image of the controlled terminal itself collected by an external image collection device configured in the working environment of the controlled terminal. The first environment information may also be position and attitude information of the controlled terminal. The position and attitude information may be collected by the controlled terminal configured with a simultaneous localization and mapping (SLAM) system, or may be collected by a position and attitude sensor of the controlled terminal. The first environment information may also be an ambient temperature or an ambient pressure of the controlled terminal. For example, the controlled terminal may perform a specific operation according to a specific ambient temperature or a specific ambient pressure. A decision to send a control instruction to the controlled terminal will be made based on the ambient temperature or the ambient pressure of the controlled terminal.

In some embodiments, the first environment information may include image data on the controlled terminal or image data collected by the controlled terminal. The first environment information may also be used to show information about multiple ambient parameters where the controlled terminal is located. The first environment information may also be used to show information about multiple parameters about an environment of the controlled terminal.

At S102, the first environment information is sent to a control terminal.

In some embodiments, the controlled terminal may be a robot and the like. The control terminal may be a remote device that controls the robot. Data transmission may be directly performed between the control terminal and the controlled terminal, or the data transmission may be performed through a server.

In some embodiments, the control terminal and the controlled terminal may be configured and set up with a one-to-one, one-to-many, or many-to-one mapping relationship as needed.

In some embodiments, sending the first environment information to the control terminal facilitates the control terminal to determine the control instruction on the controlled terminal according to the first environment information, or facilitates the control terminal to display the first environment information, such that a user can determine the control instruction on the controlled terminal according to the first environment information.

At S103, a first control instruction sent by the control terminal is received. The first control instruction and the first environment information have a mapping relationship.

In some embodiments, the first control instruction may be determined by the control terminal when the first environment information is displayed on a display interface of the control terminal.

Specifically, the control terminal may be the remote device that monitors and controls the controlled terminal. The user determines a control strategy of the controlled terminal based on the information received by the control terminal. As a result, when the first environment information of the controlled terminal is displayed at the control terminal, the user can determine the control instruction for the control terminal based on the displayed first environment information.

In some embodiments, the controlled terminal is the robot, and the control terminal is the remote device. The user can view the first environment information through the remote device, and issue the control instruction to the controlled terminal according to the first environment information. The first environment information shows the environment information of the controlled terminal at the first moment, and includes information such as whether any obstacle is present around the controlled terminal, whether a target object to be grabbed is present around the controlled terminal, and whether an activity range configured for the controlled terminal is a target stop position. These are merely example for illustration purpose. The first environment information may also include other applicable information in actual applications. The first environment information may be displayed in various forms such as images or data parameters. When viewing the first environment information through the display interface of the control terminal, the user can immediately issue the control instruction to the controlled terminal.

In some embodiments, the control instruction may be a control instruction inputted by the user at the control terminal after viewing the display interface of the controlled terminal. The control instruction may also be a control instruction obtained by the control terminal after automatically performing data processing on the image information or parameter information of the first environment information shown to the user.

In some embodiments, the first control instruction may be sent to the controlled terminal simultaneously with the first environment information.

In some embodiment, the first control instruction may also be sent to the controlled terminal simultaneously with identification information of the first environment information.

In this case, the identification information may be information such as a time stamp of the first environment information, an image ID of the image information of the first environment information, and the like.

At S104, second environment information is obtained.

In some embodiments, a data format of the second environment information may be corresponding to a data format of the first environment information.

In some embodiments, the first environment information and the second environment information may be used to show the working environment of the controlled terminal at two moments separated by a certain time interval. The first environment information and the second environment information may also be used to show the position and attitude of the controlled terminal at two moments separated by the certain time interval. The second environment information may be environment information corresponding to the controlled terminal when the control instruction is received.

At S105, an execution state of the first control instruction is determined according to difference information between the first environment information and the second environment information.

In some embodiments, the first environment information includes a first image of the working environment of the controlled terminal collected at the first moment, and the second environment information includes a second image of the working environment of the controlled terminal collected at a second moment. The corresponding difference information may be at least one of the following: an image difference between the first image and the second image; a shooting angle difference between the first image and the second image; a difference between the controlled terminal in the first image and the controlled terminal in the second image; or a difference between object information of a target object determined in the first image and object information of a target objected determined in the second image.

In some embodiments, the difference information may also be a time difference between a first time stamp of the first image and a second time stamp of the second image.

In some embodiments, the first environment information includes first degree of freedom data of the controlled terminal at the first moment, and the second environment information includes second degree of freedom data of the controlled terminal at the second moment. Correspondingly, the difference information is degree of freedom difference between the second degree of freedom data and the first degree of freedom data.

In some embodiments, whether the difference information between the first environment information and the second environment information satisfies a first set condition is determined. If the difference information satisfies the first set condition, the first control instruction is executed to control the controlled terminal. Through the above implementation manner, the controlled terminal may determine whether the first control instruction is suitable for execution in a current environment when receiving the first control instruction. For example, when the first environment information corresponding to the first control instruction differs greatly from the current second environment information, the first control instruction may not be suitable for execution in the current environment, such that the controlled terminal may choose not to execute the first control instruction or may execute the first control instruction after certain adjustment.

In some embodiments, the first set condition may be at least one of the following: the image difference between the first image and the second image is smaller than a first set difference threshold; the shooting angle difference between the first image and the second image is smaller than a first set angle threshold; the difference between the controlled terminal in the first image and the controlled terminal in the second image is smaller than a first set difference range; the difference between the object information of the set target object in the first image and the object information of the set target object in the second image is smaller than a first object difference; or the degree of freedom difference between the second degree of freedom data and the first degree of freedom data is smaller than a first degree of freedom threshold. The first set condition may be set according to actual requirements.

In some embodiments, whether the difference information between the first environment information and the second environment information satisfies a second set condition is determined. If the difference information satisfies the second set condition, the first control instruction may be adjusted according to the difference information.

In some embodiments, the second set condition may be at least one of the following: the image difference between the first image and the second image is greater than the first set difference threshold and smaller than a second set difference threshold; the shooting angle difference between the first image and the second image is greater than the first set angle threshold and smaller than a second set angle threshold; the difference between the controlled terminal in the first image and the controlled terminal in the second image is greater than the first set difference range and smaller than a second set difference range; the difference between the object information of the set target object in the first image and the object information of the set target object in the second image is greater than the first object difference and smaller than a second object difference; or the degree of freedom difference between the second degree of freedom data and the first degree of freedom data is greater than the first degree of freedom threshold and smaller than a second degree of freedom threshold. The second set condition may also be set according to actual requirements.

In some embodiments, adjusting the first control instruction according to the difference information includes adjusting the first control instruction of the controlled terminal according to a position difference of the target object in the controlled terminal. For example, the controlled terminal needs to grab a target object A. But the difference information shows that the position of the target object A in the second environment information moves a distance L in a direction F1 relative to the position in the first environment information. The first control instruction of the controlled terminal may be adjusted by moving the position of the controlled terminal in the first control instruction by the distance L in the direction F1.

In some embodiments, whether the difference information between the first environment information and the second environment information satisfies a third set condition is determined. If the difference information satisfies the third set condition, the first control instruction for controlling the controlled terminal may be determined again according to the second environment information.

In some embodiments, the third set condition may be at least one of the following: the image difference between the first image and the second image is greater than the second set difference threshold; the shooting angle difference between the first image and the second image is greater than the second set angle threshold; the difference between the controlled terminal in the first image and the controlled terminal in the second image is greater than the second set difference range; the difference between the object information of the set target object in the first image and the object information of the set target object in the second image is greater than the second object difference; or the degree of freedom difference between the second degree of freedom data and the first degree of freedom data is greater than the second degree of freedom threshold. The third set condition may also be set according to actual requirements.

Figure 2:
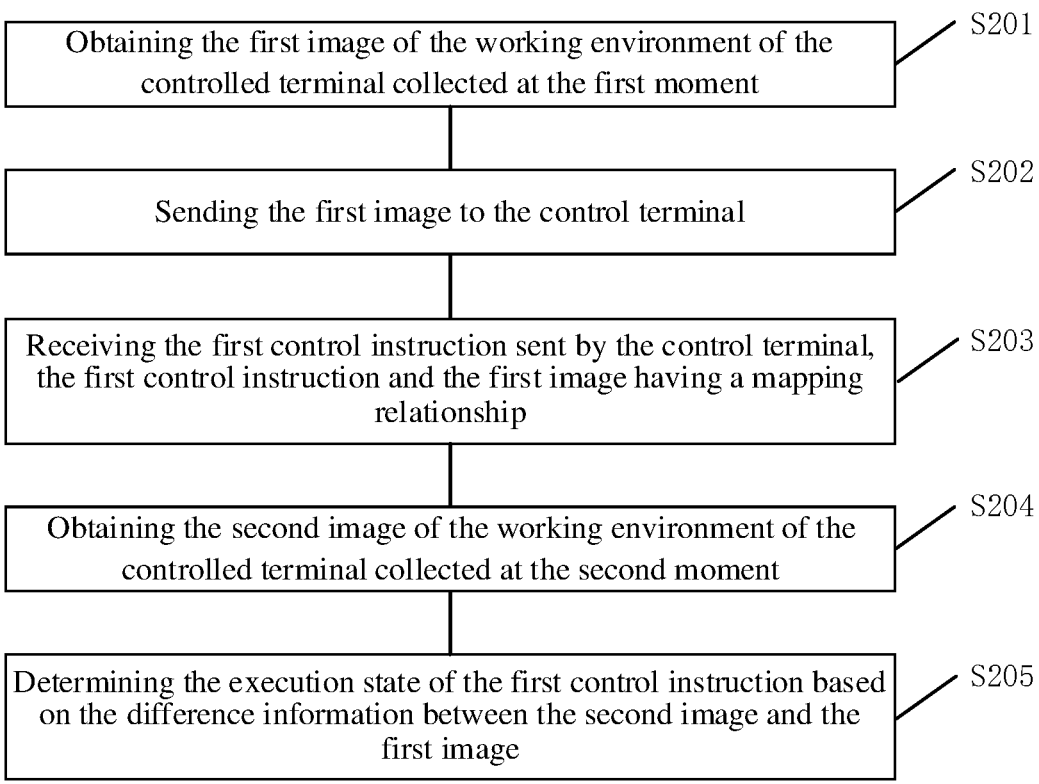
FIG. 2 is a flowchart of another exemplary remote-control method according to some embodiments of the present disclosure.

FIG. 2 is a flowchart of another exemplary remote-control method according to some embodiments of the present disclosure. The remote-control method may be applied to the controlled terminal. As shown in FIG. 2, the remote-control method includes the following processes.

At S201, the first image of the working environment of the controlled terminal collected at the first moment is obtained.

In some embodiments, the first image may be the image information of the working environment of the controlled terminal collected by the image collection device of the controlled terminal at the first moment. Through the collected image information, whether any obstacle is present at the first moment around the controlled terminal can be determined.

At S202, the first image is sent to the control terminal.

At S203, the first control instruction sent by the control terminal is received. The first control instruction and the first image have a mapping relationship.

In some embodiments, the first control instruction may be determined when the first image is displayed on the display interface of the control terminal.

At S204, the second image of the working environment of the controlled terminal collected at the second moment is obtained.

In some embodiments, the second image may be the image information of the working environment of the controlled terminal collected by the image collection device of the controlled terminal at the second moment. Through the collected image information, whether any obstacle is present at the second moment around the controlled terminal can be determined.

At S205, the execution state of the first control instruction is determined based on the difference information between the second image and the first image.

Figure 3:
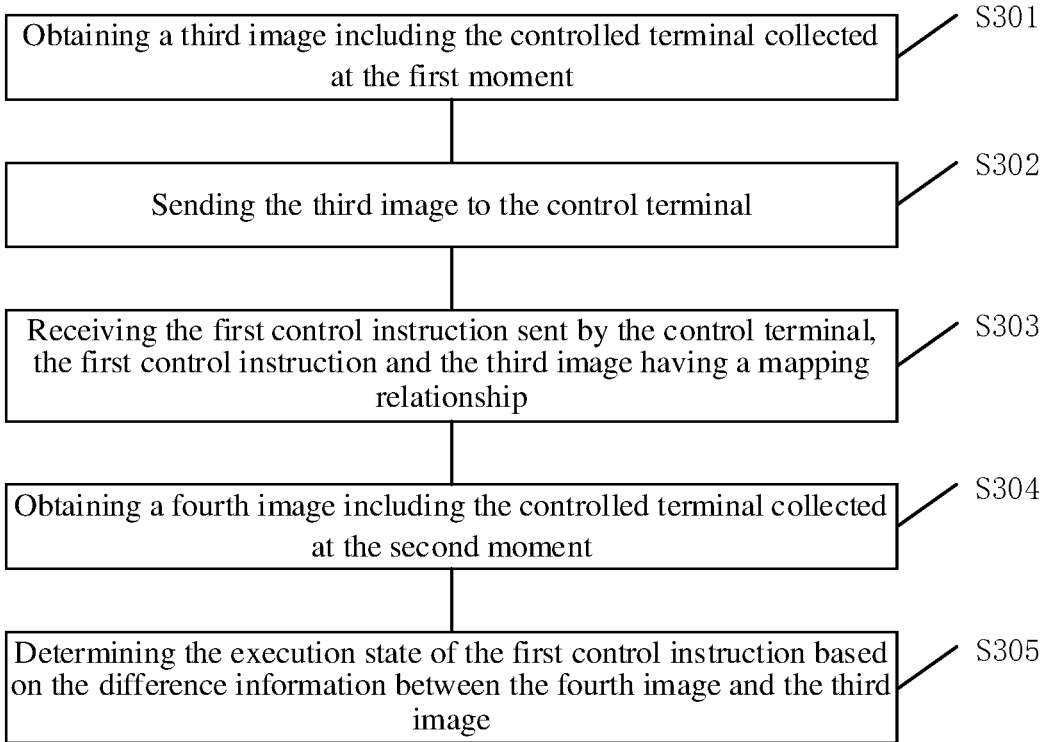
FIG. 3 is a flowchart of another exemplary remote-control method according to some embodiments of the present disclosure.

FIG. 3 is a flowchart of another exemplary remote-control method according to some embodiments of the present disclosure. The remote-control method may be applied to the controlled terminal. As shown in FIG. 3, the remote-control method includes the following processes.

At S301, a third image including the controlled terminal collected at the first moment is obtained.

At S302, the third image is sent to the control terminal.

At S303, the first control instruction sent by the control terminal is received. The first control instruction and the third image have a mapping relationship.

At S304, a fourth image including the controlled terminal collected at the second moment is obtained.

At S305, the execution state of the first control instruction is determined based on the difference information between the fourth image and the third image.

FIG. 4 is a flowchart of another exemplary remote-control method according to some embodiments of the present disclosure. The remote-control method may be applied to the controlled terminal. As shown in FIG. 4, the remote-control method includes the following processes.

At S401, the first degree of freedom data of the controlled terminal at the first moment is obtained.

At S402, the first degree of freedom data is sent to the control terminal.

At S403, the first control instruction sent by the control terminal is received. The first control instruction and the first degree of freedom data have a mapping relationship.

At S404, the second degree of freedom data of the controlled terminal at the second moment is obtained.

In some embodiments, the first degree of freedom data and the second degree of freedom data are three degrees of freedom (3DOF) data of the controlled terminal. In some other embodiments, the first degree of freedom data and the second degree of freedom data are six degrees of freedom (6DOF) data of the controlled terminal. Of course, the first degree of freedom data and the second degree of freedom data can also be other degree of freedom data, which is not specifically limited in the present disclosure.

At S405, the execution state of the first control instruction is determined based on the degree of freedom difference between the second degree of freedom data and the first degree of freedom data.

FIG. 5 is a flowchart of another exemplary remote-control method according to some embodiments of the present disclosure. The remote-control method is applied to the control terminal. As shown in FIG. 5, the remote-control method includes the following processes.

At S501, the first environment information sent by the controlled terminal is received.

At S502, the first control instruction is determined based on the first environment information. The first control instruction and the first environment information have a mapping relationship.

At S503, the first control instruction is sent to the controlled terminal, such that the controlled terminal obtains the second environment information, and determines the execution state of the first control instruction based on the different information between the first environment information and the second environment information.

The specific implementation process of S501-S503 is similar to the specific implementation process of corresponding processes in the embodiment shown in FIGS. 1-4, and the detail description thereof will be omitted herein.

The remote-control method provided by the embodiment of the present disclosure is applied to the controlled terminal. The remote-control method includes: obtaining the first environment information; sending the first environment information to the control terminal; receiving the first control instruction sent by the control terminal, the first control instruction and the first environment information having a mapping relationship; obtaining the second environment information; and determining the execution state of the first control instruction according to the difference information between the first environment information and the second environment information. In this way, in the process of controlling the controlled terminal, the first environment information of the controlled terminal is sent to the control terminal. The first control instruction corresponding to the first environment information sent by the control terminal is received. Based on the information difference between the second environment information and the first environment information, whether to execute the first control instruction or adjust the first control instruction is determined. Thus, immediacy and validity of the first control instruction are fully verified to ensure that the first control instruction can be executed in a current state of the controlled terminal.

Similar to the remote-control method, the present disclosure also provides a computer-readable storage medium, the computer-readable storage medium stores a program, and when the program is executed by a processor, the processor at least performs the following processes: obtaining the first environment information; sending the first environment information to the control terminal; receiving the first control instruction sent by the control terminal, and the first control instruction and the first environment information having a mapping relationship; obtaining the second environment information; and determining the execution state of the first control instruction based on the difference information between the first environment information and the second environment information.

Figure 6:
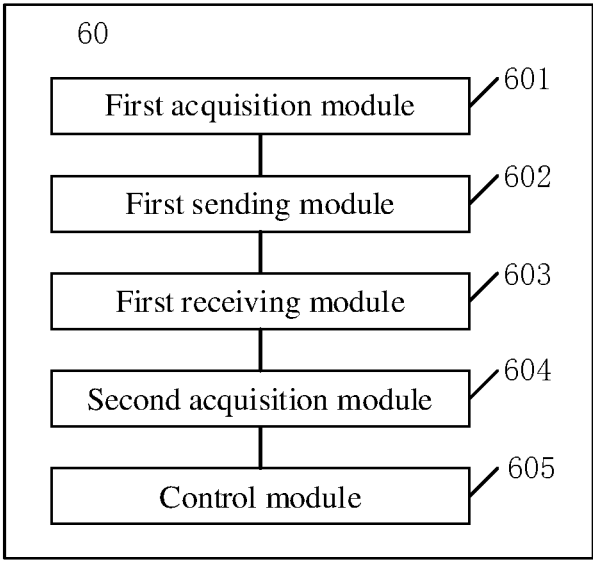
FIG. 6 is a schematic structural diagram of an exemplary remote-control device according to some embodiments of the present disclosure.

Further, based on the above-described remote-control method, the present disclosure also provides a remote-control device. The remote-control device is applied to the controlled terminal. As shown in FIG. 6, the device 60 includes: a first acquisition module 601 configured to obtain the environment information; a first sending module 602 configured to send the first environment information to the control terminal; a first receiving module 603 configured to receive the first control instruction sent by the control terminal, the first control command and the first environment information having a mapping relationship; a second acquisition module 604 configured to obtain the second environment information; and a control module 605 configured to determine the execution state of the first control command based on the difference information between the first environment information and the second environment information.

In some embodiments, the mapping relationship between the first control instruction and the first environment information includes one of the following. The first control instruction is determined by the control terminal when displaying the first environment information on the display interface of the control terminal. The first control instruction and the first environment information are sent to the controlled terminal at the same time. The first control instruction and the identification information of the first environment information are sent to the controlled terminal at the same time.

In some embodiments, the first environment information includes the first image of the working environment of the controlled terminal collected at the first moment, and the second environment information includes the second image of the working environment of the controlled terminal collected at the second moment. Correspondingly, the difference information is at least one of the following: the image difference between the first image and the second image; the shooting angle difference between the first image and the second image; or the difference between the object information of the set target object in the first image and the object information of the set target object in the second image.

In some embodiments, the first environment information includes the first degree of freedom data of the controlled terminal at the first moment, and the second environment information includes the second degree of freedom data of the controlled terminal at the second moment. Correspondingly, the difference information is the degree of freedom difference between the second degree of freedom data and the first degree of freedom data.

In some embodiments, the control module 605 includes: a first determination sub-module configured to determine whether the difference information satisfies the first set condition and a first control sub-module configured to execute the first control instruction to control the controlled terminal.

In some embodiments, the control module 605 further includes: a second determination sub-module configured to determine whether the difference information satisfies the second setting condition and a second control sub-module configured to adjust the first control instruction according to the difference information.

In some embodiments, the control module 605 further includes: a third determining sub-module configured to determine whether the difference information satisfies the third set condition and a third control sub-module configured to determine again the first control instruction for controlling the controlled terminal.

Figure 7:
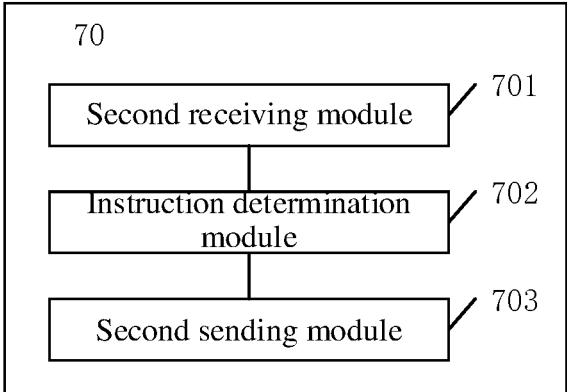
FIG. 7 is a schematic structural diagram of another exemplary remote-control device according to some embodiments of the present disclosure.

Further, based on the above-described remote-control method, the present disclosure also provides a remote-control device. The remote-control device is applied to the control terminal. As shown in FIG. 7, the remote-control device 70 includes: a second receiving module 701 configured to receive the first environment information; an instruction determination module 702 configured to determine the first control instruction based on the first environment information, and the first control instruction and the first environment information having a mapping relationship; and a second sending module 703 configured to send the first control instruction to the controlled termina, such that the controlled terminal obtains the second environment information, and determines the execution state of the first control instruction according to the difference information between the first environment information and the second environment information.

Figure 8:
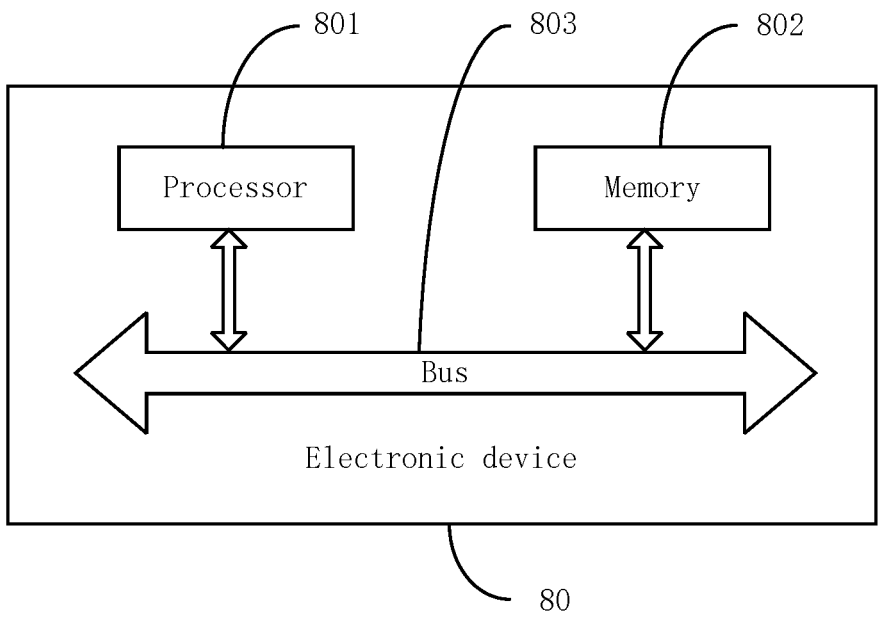
FIG. 8 is a schematic structural diagram of an exemplary electronic device according to some embodiments of the present disclosure.

Further, based on the above-described remote-control method, the present disclosure also provides an electronic device. As shown in FIG. 8, the electronic device 80 includes at least one processor 801, at least one memory 802 coupled to the processor 801, and a bus 803 connecting between the at least one processor 801 and the at least one memory 802. The at least one processor 801 and the at least one memory 802 communicate with each other through the bus 803. The at least one processor 802 is configured to invoke the program stored in the at least one memory 802 to perform the above-described remote-control method.

It should be pointed out here that: the above descriptions of the remote-control device embodiment and the electronic device embodiment are similar to the description of the remote-control method embodiment shown in FIGS. 1-5, and have the same or similar beneficial effects. The detail descriptions thereof are omitted herein. For technical details not disclosed in the remote-control device embodiment and the electronic device embodiment of the present disclosure, reference can be made to the descriptions of the remote-control method embodiments shown in FIGS. 1-5.

In some embodiments, unless otherwise defined, the technical terms or scientific terms used in the description of the embodiments of the present disclosure should have the usual meanings understood by those skilled in the art to which the embodiments of the present disclosure belong. "first\second" and similar words used in the embodiments of the present disclosure do not indicate any order, quantity or importance, but are only used to distinguish similar components.

Those skilled in the art should understand that unless otherwise defined, all terms (including technical terms and scientific terms) used herein have the same meanings as those of ordinary skill in the art to which the embodiments of the present disclosure belong. It should also be understood that terms, such as those defined in commonly used dictionaries, should be understood to have meanings consistent with their meaning in the context of the prior art, and unless specifically defined as herein, are not intended to be idealized or overly formalized.

It should be understood that reference throughout the specification to "one embodiment" or "an embodiment" means that a particular feature, structure, or characteristic related to the embodiment is included in at least one embodiment of the present disclosure. Thus, appearances of "in one embodiment" or "in an embodiment" in various places throughout the specification are not necessarily referring to the same embodiment. Furthermore, the particular features, structures or characteristics may be combined in any suitable manner in one or more embodiments. It should be understood that, in various embodiments of the present disclosure, the sequence numbers of the above-described processes do not mean the order of execution, which should be determined by its functions and internal logic, and should not constitutes any limitation on the implementation in the embodiments of the present disclosure. The sequence numbers of the above embodiments of the present disclosure are for description only, and do not represent the advantages and disadvantages of the embodiments.

It should be noted that, in the specification, the term "comprising", "including" or any other variation thereof is intended to cover a non-exclusive inclusion such that a process, method, article, or apparatus comprising a set of elements includes not only those elements, but also includes other elements not expressly listed, or elements inherent in the process, method, article, or device. Without further limitations, an element defined by the phrase "comprising a . . . " does not preclude the presence of additional identical elements in the process, method, article, or apparatus comprising that element.

In the embodiments of the present disclosure, it should be understood that the disclosed devices and methods may be implemented in other ways. The device embodiments described above are only illustrative. For example, the division of units is only a logical function division. In actual implementation, there may be other division methods, such as: multiple units or components can be combined or integrated into another system, or some features may be ignored, or not implemented. In addition, the coupling, or direct coupling, or communication connection between the components shown or discussed may be through some interfaces, and the indirect coupling or communication connection of the devices or units may be electrical, mechanical, or in another form.

The units described above as separate components may or may not be physically separated, and the components displayed as units may or may not be physical units. They may be located in one place or distributed to multiple network units. Part or all of the units can be selected according to actual needs to achieve the objective of the technical solution of the embodiments of the present disclosure.

In addition, each functional unit in the embodiments of the present disclosure may be integrated into one processing unit, or each functional unit may be used as one single unit, or two or more units may be integrated into one unit. The above-described integration of the units may be realized in the form of hardware or in the form of hardware plus software functional units.

Those of ordinary skill in the art should understand that all or part of the processes to realize the above-described method embodiments may be completed by hardware executing program instructions, and the program instructions may be stored in computer-readable storage media. When being executed by a processor, the program instructions implement the processes of the above-described method embodiments. The computer-readable storage medium includes: various media capable of storing program codes such as a removable storage device, a read-only memory (ROM), a magnetic disk, or an optical disk.

Alternatively, if the above-described integrated units of the present disclosure are realized in the form of software function modules and sold or used as standalone products, they can also be stored in the computer-readable storage medium. Based on this understanding, the technical solutions of the embodiments of the present disclosure or the part that contributes to the prior art can be embodied in the form of a software product. The computer software product is stored in the computer-readable storage medium and includes program instructions for causing a computer device (which may be a personal computer, a server, or a network device, etc.) to execute all or part of the remote-control methods in various embodiments of the present disclosure. The computer-readable storage medium includes various media capable of storing program codes such as removable storage devices, ROMs, magnetic disks or optical disks.

The above description of the disclosed embodiments enables those skilled in the art to implement or use the present disclosure. Various modifications to the embodiments will be obvious to those skilled in the art, and the general principles defined herein can be implemented in other embodiments without departing from the spirit or scope of the present disclosure. Therefore, this application will not be limited to the embodiments shown in the specification, but should conform to the broadest scope consistent with the principles and novelties disclosed in the specification.

What is claimed is:

1. A remote-control method being applied to a controlled terminal, comprising:
   obtaining first environment information associated with a first moment;
   sending the first environment information to a control terminal;
   receiving a first control instruction sent by the control terminal, the first control instruction and the first environment information having a mapping relationship;
   obtaining second environment information associated with a second moment, the second moment corresponding to a moment when the first control instruction is received at the controlled terminal; and
   determining an execution state of the first control instruction based on difference information between the first environment information and the second environment information, the difference information being representative of a change in an environment of the controlled terminal between the first moment and the second moment,
   wherein the determining the execution state of the first control instruction based on the difference information between the first environment information and the second environment information includes:
   determining whether the difference information satisfies a first set condition, wherein the difference information satisfies the first set condition when the difference information indicates that the change is less than a first set difference threshold; and
   in response to the difference information satisfying the first set condition, executing the first control instruction to control the controlled terminal.

2. The remote-control method according to claim 1, wherein the mapping relationship between the first control instruction and the first environment information includes one of:
   determining the first control instruction by the control terminal when the first environment information is displayed on a display interface of the control terminal;
   sending by the control terminal the first control instruction and the first environment at the same time to the controlled terminal; and
   sending by the control terminal the first control instruction and identification information of the first environment information at the same time to the controlled terminal.

3. The remote-control method according to claim 1, wherein:
   the first environment information includes a first image of a working environment of the controlled terminal collected at the first moment;
   the second environment information includes a second image of the working environment of the controlled terminal collected at the second moment; and
   the difference information includes at one of:

an image difference between the first image and the second image;

a shooting angle difference between the first image and the second image;

a difference between the controlled terminal in the first image and the controlled terminal in the second image; or a difference between object information of a set target object in the first image and object information of the set target object in the second image.

4. The remote-control method according to claim 1, wherein:

the first environment information includes first degree of freedom data of the controlled terminal at the first moment;

the second environment information includes second degree of freedom data of the controlled terminal at the second moment; and the difference information includes degree of freedom difference between the second degree of freedom data and the first degree of freedom data.

5. The remote-control method according to claim 1, wherein determining the execution state of the first control instruction based on the difference information between the first environment information and the second environment information includes:

determining whether the difference information satisfies a second set condition, wherein the difference information satisfies the second set condition when the difference information indicates that the change is greater than the first set difference threshold but less than a second set difference threshold; and in response to the difference information satisfying the second set condition, adjusting the first control instruction based on the difference information, the adjusting comprising moving a position of the controlled terminal in the first control instruction by a distance in a direction.

6. The remote-control method according to claim 5, wherein determining the execution state of the first control instruction based on the difference information between the first environment information and the second environment information includes:

determining whether the difference information satisfies a third set condition, wherein the difference information satisfies the third set condition when the difference information indicates that the change is greater than the second set difference threshold; and in response to the difference information satisfying the third set condition, determining a second control instruction to control the controlled terminal based on the second environment information, the second control instruction being different from the first instruction.

7. A remote-control method being applied to a control terminal, comprising:

receiving first environment information sent by a controlled terminal, the first environment information being associated with a first moment;

determining a first control instruction for controlling the controlled terminal based on the first environment information, the first control instruction and the first environment information having a mapping relationship; and sending the first control instruction to the controlled terminal, such that the controlled terminal obtains second environment information associated with a second moment, the second moment corresponding to a moment when the first control instruction is received at the controlled terminal, and determines an execution state of the first control instruction based on difference information between the first environment information and the second environment information, the difference information being representative of a change in an environment of the controlled terminal between the first moment and the second moment, wherein the determining the execution state of the first control instruction based on the difference information between the first environment information and the second environment information includes:

determining whether the difference information satisfies a first set condition, wherein the difference information satisfies the first set condition when the difference information indicates that the change is less than a first set difference threshold; and in response to the difference information satisfying the first set condition, executing the first control instruction to control the controlled terminal.

8. The remote-control method according to claim 7, wherein the mapping relationship between the first control instruction and the first environment information includes one of:

determining the first control instruction when the first environment information is displayed on a display interface of the control terminal;

sending the first control instruction and the first environment at the same time to the controlled terminal; and sending the first control instruction and identification information of the first environment information at the same time to the controlled terminal.

9. The remote-control method according to claim 7, wherein:

the first environment information includes a first image of a working environment of the controlled terminal collected at the first moment;

the second environment information includes a second image of the working environment of the controlled terminal collected at the second moment; and the difference information includes at one of:

an image difference between the first image and the second image;

a shooting angle difference between the first image and the second image;

a difference between the controlled terminal in the first image and the controlled terminal in the second image; or a difference between object information of a set target object in the first image and object information of the set target object in the second image.

10. A remote-control device being applied to a controlled terminal, comprising:

a memory storing program instructions; and a processor coupled to the memory;

wherein when being executed by the processor, the program instructions cause the processor to:

obtain first environment information associated with a first moment;

send the first environment information to a control terminal;

receive a first control instruction sent by the control terminal, the first control instruction and the first environment information having a mapping relationship;

obtain second environment information associated with a second moment, the second moment corresponding to a moment when the first control instruction is received at the controlled terminal; and determine an execution state of the first control instruction based on difference information between the first environment information and the second environment information, the difference information being representative of a change in an environment of the controlled terminal between the first moment and the second moment, wherein when determining the execution state of the first control instruction based on the difference information between the first environment information and the second environment information, the processor is further configured to:

determine whether the difference information satisfies a first set condition, wherein the difference information satisfies the first set condition when the difference information indicates that the change is less than a first set difference threshold; and in response to the difference information satisfying the first set condition, execute the first control instruction to control the controlled terminal.

11. The remote-control device according to claim 10, wherein the mapping relationship between the first control instruction and the first environment information includes one of:

determining the first control instruction by the control terminal when the first environment information is displayed on a display interface of the control terminal;

sending by the control terminal the first control instruction and the first environment at the same time to the controlled terminal; and sending by the control terminal the first control instruction and identification information of the first environment information at the same time to the controlled terminal.

12. The remote-control device according to claim 10, wherein:

the first environment information includes a first image of a working environment of the controlled terminal collected at the first moment;

the second environment information includes a second image of the working environment of the controlled terminal collected at the second moment; and the difference information includes at one of:

an image difference between the first image and the second image;

a shooting angle difference between the first image and the second image;

a difference between the controlled terminal in the first image and the controlled terminal in the second image; or a difference between object information of a set target object in the first image and object information of the set target object in the second image.

13. The remote-control device according to claim 10, wherein:

the first environment information includes first degree of freedom data of the controlled terminal at the first moment;

the second environment information includes second degree of freedom data of the controlled terminal at the second moment; and the difference information includes degree of freedom difference between the second degree of freedom data and the first degree of freedom data.

14. The remote-control device according to claim 10, wherein when determining the execution state of the first control instruction based on the difference information between the first environment information and the second environment information, the processor is further configured to:

determine whether the difference information satisfies a second set condition, wherein the difference information satisfies the second set condition when the difference information indicates that the change is greater than the first set difference threshold but less than a second set difference threshold; and in response to the difference information satisfying the second set condition, adjust the first control instruction based on the difference information, the adjusting comprising moving a position of the controlled terminal in the first control instruction by a distance in a direction.

15. The remote-control device according to claim 14, wherein when determining the execution state of the first control instruction based on the difference information between the first environment information and the second environment information, the processor is further configured to:

determine whether the difference information satisfies a third set condition, wherein the difference information satisfies the third set condition when the difference information indicates that the change is greater than the second set difference threshold; and in response to the difference information satisfying the third set condition, determine a second control instruction to control the controlled terminal based on the second environment information, the second control instruction being different from the first instruction.

* * * * *